United States Patent
Materne et al.

(10) Patent No.: US 6,306,949 B1
(45) Date of Patent: *Oct. 23, 2001

(54) PREPARATION OF REINFORCED RUBBER AND USE IN TIRES

(75) Inventors: Thierry Florent Edmé Materne, Fairlawn, OH (US); Giorgio Agostini, Colmar-Berg (LU); Ghislain Adolphe Léon Thise, Bastogne (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/177,451

(22) Filed: Oct. 22, 1998

(51) Int. Cl.$^7$ ................. C08J 5/10; C08K 3/04; C08L 9/06
(52) U.S. Cl. ............. 524/495; 524/496; 524/430; 524/492; 524/493; 523/215; 523/216; 152/905; 152/209.5; 152/209.4
(58) Field of Search ................. 152/905, 209.5, 152/209.4; 524/430, 495, 496, 492, 493; 523/215, 216

(56) References Cited

U.S. PATENT DOCUMENTS 5,674,932 * 10/1997 Agostini et al. ................. 524/430

FOREIGN PATENT DOCUMENTS 0845493  6/1998 (EP) ................. C08K/5/54

OTHER PUBLICATIONS

Pp. 289 through 299; "The Effect of Bis(3–Triethoxysilypropyl) Tetrasulfide on Silica Reinforcement of Styrene–Butadiene Rubber" by A.S. Hashim et al., dated May 1, 1998.

* cited by examiner

Primary Examiner—James J. Seidleck
Assistant Examiner—U. K. Rajguru
(74) Attorney, Agent, or Firm—Henry C Young Jr

(57) ABSTRACT

The invention relates to the preparation of a rubber composition containing silica-based filler reinforcement through the utilization of a organosilane disulfide compound mixed with a rubber composition in at least one preparatory, non-productive, mixing stage followed by utilization of an organosilane polysulfide compound mixed with the rubber composition in a subsequent, productive, mixing stage. The invention further relates to the resulting rubber composition and use thereof in tires.

41 Claims, No Drawings

PREPARATION OF REINFORCED RUBBER AND USE IN TIRES

FIELD

This invention relates to the preparation of rubber compositions which contain silica-based reinforcement and utilizing an organosilane disulfide compound mixed with a rubber composition in at least one non-productive mixing stage followed by utilization of an organosilane polysulfide compound in a subsequent productive mixing stage.

The invention also relates to such prepared rubber compositions and particularly to tires having treads thereof.

BACKGROUND

For various applications utilizing rubber which require high strength and abrasion resistance, particularly applications such as tires and various industrial products, sulfur-cured rubber is utilized which contains substantial amounts of reinforcing fillers. Carbon black is commonly used for such purpose and normally provides or enhances good physical properties for the sulfur cured rubber. Particulate, precipitated silica is also sometimes used for such purpose, particularly when the silica is used in conjunction with a coupling agent. In some cases, a combination of precipitated silica and carbon black is utilized for reinforcing fillers for various rubber products, including treads for tires.

Coupling agents such as, for example, an organosilane polysulfide having an average of from 3.5 to 4 sulfur atoms in its polysulfidic bridge has been used for coupling precipitated silica to elastomers.

Exemplary of such organosilane polysulfide is bis-3 (triethoxysilylpropyl) polysulfide with an average of about 3.8 sulfur atoms in its polysulfidic bridge. It is envisioned that such polysulfide can be a sulfur donor, by liberating free sulfur, during typical high shear mixing of a rubber composition at an elevated temperature such as, for example, at temperatures of 100° C. and above, depending somewhat upon the polysulfide used and the mixing temperature and time.

The small amount of free, liberated, sulfur is then available to combine with and/or possibly partially vulcanize, a diene-based elastomer.

It is, however, considered herein that an organosilane polysulfide compound, which is primarily a disulfide, having an average of about 2.6 or less sulfur atoms in its polysulfidic bridge, is not normally a good sulfur donor under such mixing conditions, due to the relatively strong sulfur-to-sulfur bonds typical of an organosilane disulfide—as compared to an organosilane polysulfide with an average of at least 3.5 sulfur atoms in its polysulfidic bridge.

Accordingly, it is considered herein that, for an organosilane polysulfide compound (disulfide) which contains an average of less than 2.8 and particularly within a range of about 2 to about 2.6, sulfur atoms in its polysulfidic bridge, the liberation of free sulfur, if any, occurs at a relatively slow rate during a high shear rubber mixing stage, even at a mixing temperature in a range of about 150° C. to about 185° C. depending somewhat upon the overall mixing conditions, including the mixing time itself.

Bis-(3-triethoxysilylpropyl) disulfide, as a variety of organosilane disulfide, is also taught as being useful in a silica-containing sulfur vulcanizable elastomer composition, even as a high purity form of such disulfide in, for example, U.S. Pat. No. 4,046,550 and German Patent Publication DT 2,360,471. However, it is considered herein that such disulfide does not ordinarily readily liberate free sulfur in such aforementioned rubber/silica/coupler mixing operation.

For examples of organosilane polysulfides for use as silica couplers, see U.S. Pat. Nos. 4,076,550; 4,704,414; and 3,873,489.

For examples of organosilane disulfides added in a preparatory, non-productive, rubber composition mixing stage, along with a small amount of free sulfur, see U.S. Pat. Nos. 4,076,550; 5,580,919 and 5,674,932.

In practice, sulfur vulcanized elastomer products are typically prepared by thermomechanically mixing rubber and various ingredients in a sequentially step-wise manner followed by shaping and curing the compounded rubber to form a vulcanized product.

First, for the aforesaid mixing of the rubber and various ingredients, typically exclusive of free sulfur and sulfur vulcanization accelerators, the elastomer(s) and various rubber compounding ingredients are typically blended in at least one, and usually at least two, sequential, preparatory thermomechanical mixing stage(s) in suitable mixers, usually internal rubber mixers. Such preparatory mixing is often referred to as "non-productive mixing", or "non-productive mixing steps or stages". Such preparatory mixing is usually conducted at temperatures in a range of about 140° C. to 190° C. and more often in a range of about 140° C. or 150° C. to about 185° C.

Subsequent to such sequential, preparatory mix stage(s), free sulfur and sulfur vulcanization accelerators, and possibly one or more additional ingredients, are mixed with the rubber compound, or composition, in a final, productive, mix stage, typically at a temperature within a range of about 100° C. to about 130° C., which is a lower temperature than the temperatures utilized in the aforesaid preparatory mix stage(s) in order to prevent or retard premature curing of the sulfur curable rubber, which is sometimes referred to as "scorching", of the rubber composition.

Such sequential, non-productive, mixing steps, and the subsequent productive mixing step are well known to those in the rubber mixing art.

By thermomechanical mixing, it is meant that the rubber compound, or composition of rubber and rubber compounding ingredients, is mixed in a rubber mixture under high shear conditions where it autogeneously heats up, with an accompanying temperature rise, as a result of the mixing primarily due to shear and associated friction within the rubber mixture in the rubber mixer.

Such thermomechanical rubber compound mixing procedure and associated sheer and accompanying temperature rise aspects are well known to those having experience in the rubber preparation and mixing art.

In practice, it is believed that the inventors' prescribed procedure of (1) adding an organosilane disulfide in a non-productive rubber composition mixing stage followed by (2) subsequently adding an organosilane polysulfide with an average of from 3.5 to 4.5 sulfur atoms in its polysulfidic bridge together with a small amount of free sulfur in a productive rubber composition mixing stage for a silica-based reinforced rubber composition, particularly as a means of controlling the associated sulfur/elastomer interaction as well as interaction with a silane/silica network, or product, created by reaction of the disulfide in the prior, preparatory, mixing stage(s) is novel and inventive in view of past practice.

In one aspect, it is believed that a decoupling of an initial silane/silica reaction with a subsequent release of free sulfur, and an additional silane reaction, to interact with the elastomer(s) and silane/silica network in a sequential rubber composition mixing procedure is accomplished by using a combination of separate and selective addition of an organosilane disulfide preliminary mixing stage and addition of an organosilane polysulfide followed by vulcanizing the rubber composition according to the procedure of this invention is a significant departure from past practice.

The term "phr" as used herein, and according to conventional practice, refers to "parts of a respective material per 100 parts by weight of rubber, or elastomer".

In the description of this invention, the terms "rubber" and "elastomer" if used herein, may be used interchangeably, unless otherwise prescribed. The terms such as "rubber composition", "compounded rubber" and "rubber compound", if used herein, are used interchangeably to refer to "rubber which has been blended or mixed with various ingredients and materials" and "rubber compounding" or "compounding" may be used to refer to the "mixing of such materials". Such terms are well known to those having skill in the rubber mixing or rubber compounding art.

A reference to an elastomer's "Tg", if used herein, refers to a "glass transition temperature" which can be determined by a differential scanning calorimeter at a heating rate of 10° C. per minute.

SUMMARY AND PRACTICE OF THE INVENTION

In accordance with this invention, a process of preparing a rubber composition comprises the steps of:

(A) thermomechanically mixing in at least one sequential preparatory mixing step and to a temperature within a range of about 150° C. to about 185° C. and in the absence of addition of free sulfur (1) 100 parts by weight of at least one diene-based elastomer selected from conjugated diene homopolymers and copolymers and copolymers of at least one conjugated diene and aromatic vinyl compound, (2) about 30 to about 100, alternatively about 30 to about 90, phr of particulate reinforcing filler comprised of about 5 to about 85 weight percent carbon black and, correspondingly, about 15 to about 95 percent of at least one additional reinforcing filler selected from at least one of the group consisting of alumina and silica-based fillers selected from at least one of precipitated silica, aluminosilicate, and modified carbon black containing silicon hydroxide on its surface, and (3) about 0.05 to about 20, alternatively about 0.05 to about 10, parts by weight per part by weight of said alumina and silica-based filler of at least one organosilane disulfide compound of the formula (I):

followed by:

B) mixing free sulfur and at least one organosilane polysulfide of the formula (II) therewith in a subsequent mixing step to a temperature within in a range of about 100° C. to about 130° C.:

wherein n is a number of from 2 to about 6 and the average for n is within a range of from about 2 to about 2.6;

wherein m is a number of from 2 to about 8 and the average for m is within a range of about 3.5 to about 4.5;

wherein Z is selected from the group consisting of:

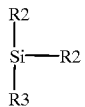

(Z1)

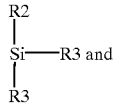

(Z2)

(Z3)

wherein R2 may be the same or different radical and is individually selected from the group consisting of alkyl radicals having 1 to 4 carbons and phenyl radical, preferably from methyl and ethyl radicals; R3 may be the same or different radical and is individually selected from the group consisting of alkyl radicals having 1 to 4 carbon atoms, phenyl radical, alkoxy groups having 1 to 8 carbon atoms and cycloalkoxy groups with 5 to 8 carbon atoms, preferably from methyl and ethyl groups; and R1 is a radical selected from the group consisting of a substituted or unsubstituted alkyl radicals having a total of 1 to 18 carbon atoms and a substituted or unsubstituted aryl radical having a total of 6 to 12 carbon atoms wherein R1 is preferably selected from ethyl, propyl and butyl radicals.

In practice, it is preferred, for the above said mixing step (B) that the total of free sulfur and about fifty percent of the sulfur in the polysulfide bridge of said organosilane polysulfide of formula (II) is in a range of about 0.93 to about 4, alternatively about 0.93 to about 2.8, phr.

In practice, between each mixing step the rubber composition is allowed to cool to a temperature below about 40° C. such as, for example, within a range of about 40° C., to about 20° C.

In practice, the total mixing time for said preparatory (non-productive) mixing steps may be in a range of about two to about 20, alternatively about four to about 15, minutes and about one to about three minutes for said subsequent (productive) mixing step.

Preferably, said organosilane disulfide compound (I) and organopolysulfide compound (II) are of a bis-(3-trialkoxysilylalkyl) polysulfide; wherein the alkyl radicals of the alkoxy groups are selected from methyl and ethyl groups and the alkyl radical of the silylalkyl group is selected from ethyl, propyl and butyl radicals.

For said formula (I), the organosilane disulfide compound is, primarily, an organosilane disulfide, and usually it is a mixture of organosilane polysulfide, in which at least 55, usually at least 65, percent of n is 2, and preferably about 80 to about 100 percent of n is 2.

For said organosilane polysulfide compound of formula (II), generally at least 70 percent, and preferably about 80 to about 100 percent, of m is in a range of about 3.5 to about 4.5;

In one aspect, the organosilane polysulfide of formula (II) has a property of releasing at least a portion of its sulfur at a temperature in a range of about 150° C. to about 185° C. In particular, it may be considered, depending upon the selection and amount of organosilane polysulfide used, that free sulfur released from said organosilane polysulfide (II) during the molding and curing of the rubber composition at an elevated temperature in a range of about 140° C. to about 185° C. may, for example, be within a range of about 0.13 to about one phr assuming that about 40 to about 60 percent of the sulfur atoms in the polysulfidic bridge of the polysulfide are liberated as free sulfur.

An overall philosophy of this invention is considered herein to be in a sense of separately and selectively first promoting a silane reaction with the reinforcing fillers without a premature release of free sulfur and then, subsequently, promoting both a further silane reaction with the product of the first silane reaction previously promoted by the organosilane disulfide compound (I) as well as a release of free sulfur via subsequent addition of the organosilane polysulfide (II). A particular benefit is seen that preventing a premature release of free sulfur during the preparatory elastomer mixing stage(s) enables a lower viscosity of the rubber composition during its mixing and, therefore, promotes better processing of the rubber composition as it is being mixed. A further benefit of the procedure of this invention is the subsequent silane reaction with the product of the first silane reaction together with a subsequent generation of free sulfur.

This is accomplished by the manipulation of first mixing the organosilane disulfide compound (I) with the elastomer (s) and reinforcing fillers followed by subsequently and separately mixing the organosilane polysulfide compound (II) with the rubber and silane-filler network product.

It is considered that such process is novel and significant departure from past practice.

In practice, then, a viscosity build-up of the rubber composition during its preparatory, non-productive, mixing stage(s) due to a premature partial vulcanization due to a release of free sulfur from a organosilane polysulfide compound (II) having an average of about 3.5 to about 4.5 sulfur atoms in its polysulfidic bridge is avoided. However, the benefits of the reaction of the organosilane component of the organosilane disulfide compound (I) with the reinforcing fillers is still obtained.

By subsequently adding the organosilane polysulfide compound (II) in the productive stage at lower temperature mixing conditions and allowing the added organosilane polysulfide (II) compound to aid in the vulcanization of the rubber composition both by allowing the silane portion of organosilane polysulfide compound (II) to interact with the previously created organosilane/silica composite, or network of such composites and, also, releasing free sulfur at the higher curing temperature.

This aspect of the invention, as it is understood, is accomplished by first utilizing an organosilane disulfide compound version (I) which has an active silane moiety but does not appreciably release free sulfur so that free sulfur is not liberated during the preliminary, non-productive, mixing stage(s) and so that sulfur can then be later and separately added via the hereinbefore described organosilane polysulfide compound (II) in the vulcanization of the rubber composition. In this manner the benefits of initially and selectively reacting the silane portion of the organosilane disulfide compound with the silica-based filler is obtained but delaying the release of free sulfur, and additional silane interaction until after both the preliminary non-productive mixing step(s) at the higher mixing temperature and the subsequent, productive, mixing step at the lower mixing temperature and until the vulcanization of the rubber composition at the higher temperature.

Thus, while the mechanism may not be completely understood, it is believed that the vulcanization of the rubber composition at the elevated temperature is enhanced by the presence of the silane component of the organosilane polysulfide and its resultant combination with an organosilane/silica composite and/or network previously created by the interaction of the silane portion of the organosilane disulfide and the alumina and/or silica-based filler.

In one aspect of the invention, such process is provided wherein said preparatory mixing is conducted in at least two sequential thermomechanical mixing steps, of which at least two of such mixing steps are to a temperature in a range of about 140° C. to about 185° C., with intermediate cooling of the rubber composition between at least two of said mixing steps to a temperature below about 40° C.

In further accordance with this invention, a rubber composition is provided as being prepared according to the method of this invention, particularly where said rubber composition is sulfur-cured at an elevated temperature in a range of about 140° C. to about 185° C.

In additional accordance with this invention, an article is provided having at least one component of said rubber composition.

In further accordance with this invention a tire is provided having at least one component of said rubber composition.

In additional accordance with this invention, a tire is provided having a tread of said rubber composition, particularly where said tire tread is designed to be ground-contacting.

In one aspect, the prepared rubber composition is vulcanized in a suitable mold at an elevated temperature in a range of about 140° C. to about 190° C.

In additional accordance with the invention, the process comprises the additional steps of preparing an assembly of a tire or sulfur vulcanizable rubber with a tread comprised of the said rubber composition prepared according to the process of this invention and vulcanizing the assembly at a temperature in a range of about 140° C. to about 185° C. or 190° C.

Accordingly, the invention also thereby contemplates a vulcanized tire prepared by such process.

In practice, the organosilane disulfide of formula (I) and the organosilane polysulfide of formula (II) are typically liquid and are preferably individually provided in a form of a composite of the organosilane disulfide formula (I) and carbon black and of the organosilane polysulfide formula (II) and carbon black, in order to provide them in a form of a relatively dry, or substantially dry, powder in which the carbon black acts as a carrier.

A contemplated benefit for adding the organosilanes disulfide and polysulfide in such a particulate form is to aid in their dispersing in the associated mixing steps with the rubber composition.

In one aspect of the invention, optionally a total of about 0.05 to about 5 phr of at least one alkyl alkoxy silane can be thermomechanically mixed in the preparatory mixing stage (s), particularly where said alkyl silane has the formula: R'—Si—(OR)3, where R is a methyl, ethyl, propyl or isopropyl radical and R' is a saturated alkyl radical having from 1 to 18 carbon atoms, or an aryl or saturated alkyl substituted aryl radical having from 6 to 12 carbon atoms. Such aryl or substituted aryl radicals might be, for example, benzyl, phenyl, tolyl, methyl tolyl, and alpha methyl tolyl radicals.

A purpose of the alkyl alkoxy silane is, for example, to improve filler incorporation and compound aging. Representative examples of alkyl silanes are, for example but not intended to be limited to, propyltriethoxysilane, methyltriethoxy silane, hexadecyltriethoxysilane, and octadecyltriethoxysilane.

In practice, as hereinbefore discussed, the organosilane polysulfide compound of formula (II) is added in the lower temperature productive mixing step, or stage, which subsequently liberates free sulfur at the higher temperature experienced during the molding and curing of the resultant rubber composition in which it is contemplated that the silane component of the organosilane polysulfide compound of formula (II) reacts with the previously formed silane/filler network via the prior reaction with the previously added organosilane disulfide compound of formula (I). While an actual calculation may necessarily have to be done on an individual basis, depending upon the actual number of sulfur atoms in the sulfur bridge as well as other factors, the amount of free sulfur to be added in the productive mixing stage, or step, plus the amount of free sulfur liberated via the organosilane polysulfide compound of formula (II), is contemplated to be in a range of about 0.93 to about 4, alternatively about 0.93 to about 2.8, phr. This assumes that from about 40 to about 60 percent of the sulfur of the organosilane polysulfide compound of formula (II) is liberated as free sulfur during the curing step.

In practice, it is preferred that at least one phr of free sulfur and at least one phr of the organosilane polysulfide compound of formula (II) are added in the productive mixing stage.

Vulcanization accelerators are conventionally added in the productive mixing stage. Some vulcanization accelerators are not conventionally considered as being sulfur donors in a sense of liberating free sulfur, it is appreciated that they may be, for example, of the type such as, for example, benzothiazole, alkyl thiuram disulfide, guanidine derivatives and thiocarbamates. Representative of such accelerators are, for example but not limited to, mercapto benzothiazole, tetramethyl thiuram disulfide, benzothiazole disulfide, diphenylguanidine, zinc dithiocarbamate, alkylphenoldisulfide, zinc butyl xanthate, N-dicyclohexyl-2-benzothiazolesulfenamide, N-cyclohexyl-2-benzothiazolesulfenamide, N-oxydiethylenebenzothiazole-2-sulfenamide, N,N diphenylthiourea, dithiocarbamylesulfenamide, N,N diisopropylbezothiozole-2-sulfenamide, zinc-2-mercaptotoluimidazole, dithiobis (N methyl piperazine), dithiobis(N beta hydroxy ethyl piperazine) and dithiobis(dibenzyl amine). Such materials are understood herein to be well known as sulfur vulcanization accelerators for sulfur vulcanizable elastomers to those having skill in the rubber compounding art.

If desired, although not preferred in the practice of this invention, additional conventional sulfur donors may be added in the final, productive mixing stage, so long as the total amount of free sulfur added in the productive mixing stage and free sulfur liberated in the curing stage from the aforesaid organosilane polysulfide compound and the sulfur donor additive is in a range of about 0.93 to about 4 phr. Representative of such additional sulfur donors are, for example, thiuram and morpholine derivatives. Representative of such materials are, for example, dimorpholine disulfide, dimorpholine tetrasulfide, tetramethyl thiuram tetrasulfide, benzothiazyl-2,N dithiomorpholide, thioplasts, dipentamethylenethiurahexasulfide, and disulfidecaprolactame. Such materials are understood to be well known sulfur donors to those having skill in the rubber compounding art. To the extent that such sulfur donors are added in the productive mixing stage, the amount of free sulfur to be added is correspondingly reduced.

For the filler reinforcement for this invention, silica-based pigments are contemplated which may be used in combination with carbon black.

In one aspect of the invention, it is preferred that the silica-based filler is precipitated silica.

In another aspect of the invention, it is preferred that the silica-based filler is a carbon black having silicon hydroxide on its outer surface.

In further aspect of the invention, it is preferred that the silica-based filler is an aluminosilicate as a co-precipitated combination of silica and aluminum with an aluminum content in a range of about 0.05 to about 10 percent of such silica/aluminum filler composite.

The carbon black having silicon hydroxide on its surface may be prepared, for example, by co-fuming an organosilane and oil at an elevated temperature.

In practice, the reinforcing filler may be comprised of about 15 to about 95 weight percent precipitated silica, alumina, aluminosilicate and/or carbon black containing silicon hydroxide on its surface and, correspondingly, about 5 to about 85 weight percent carbon black.

Where it is desired for the rubber composition which contains both a silica-based filler such as precipitated silica, alumina, aluminosilicates and/or carbon black having silicon hydroxide on its surface, and also carbon black reinforcing fillers, it is often preferable that the weight ratio of such silica-based filler(s) to carbon black is at least 1.1/1 and often at least 3/1, even at least 10/1 and, thus, in a range of about 1.1/1 to about 30/1.

For the aforesaid organosilane disulfide of formula (I) and the organosilane polysulfide of formula (II), representative R2 radicals are alkyl radicals and representative R1 radicals are selected from alkaryl, phenyl and haloaryl radicals.

Thus, in one aspect of the invention, the R2 and R1 radicals are mutually exclusive. Preferably such radicals are alkyl radicals Representative examples of such alkyl radicals are methyl, ethyl, n-propyl and n-decyl radicals with the n-propyl radical being preferred.

Representative examples of aralkyl radicals are benzyl and alpha, alpha dimethylbenzyl radicals being preferred, if such radicals are to be used.

Representative examples of alkaryl radicals are p-tolyl and p-nonylphenol radicals, if such radicals are to be used.

A representative example of a haloaryl radical is a p-chlorophenol radical, if such radical is to be used.

Representative examples of organosilane polysulfides of the compound of the formula (II) are, for example and not intended to be limiting, are bis(3-trimethoxylsilylpropyl) trisulfide, bis(3-trimethoxylsilylpropyl)tetrasulfide, bis(3-triethoxysilylpropyl)trisulfide, bis(3-triethoxysilylpropyl) tetrasulfide, bis(3-triethoxysilylethyltolylene)trisulfide and bis(3-triethoxysilylethyltolylene)tetrasulfide.

Representative examples of organosilane disulfide compounds of formula (I) blend are, for example: 2 2'-bis (trimethoxysilylethyl)disulfide; 3,3'-bis (trimethoxysilylpropyl)disulfide; 3,3'-bis (triethoxysilylpropyl)disulfide; 2,2'-bis(triethoxysilylethyl) disulfide; 2,2'-bis(tripropoxysilylethyl)disulfide; 2,2'-bi(tri-sec.butoxysilylethyl)disulfide; 2,2'-bis(tri-t-butoxyethyl) disulfide; 2,2'-bis(triethoxysilylethyl tolylene)disulfide; 2,2'-bis(trimethoxysilylethyl tolylene)disulfide; 3,3'-bis (triisopropoxypropyl)disulfide; 3,3'-bis(trioctoxypropyl) disulfide; 2,2'-bis(2'-ethylhexoxysilylethyl)disulfide; 2,2'-bis(dimethoxy ethoxysilylethyl)disulfide; 3,3'-bis (methoxyethoxypropoxysilylpropyl)disulfide; 3,3'-bis (methoxy dimethylsilylpropyl)disulfide; 3,3'-bis (cyclohexoxy dimethylsilylpropyl)disulfide; 4,4'-bis(trimethoxysilylbutyl)disulfide; 3,3'-bis(trimethoxysilyl-3-methylpropyl)disulfide; 3,3'-bis(tripropoxysilyl-3-methylpropyl)disulfide; 3,3'-bis(dimethoxy methylsilyl-3-ethylpropyl)disulfide; 3,3'-bis(trimethoxysilyl-2-methylpropyl)disulfide; 3,3'-bis(dimethoxyphenylsilyl-2-methylpropyl)disulfide; 3,3'-bis(trimethoxysilylcyclohexyl)disulfide; 12,12'-bis(trimethoxysilyldodecyl)disulfide; 12,12'-bis(triethoxysilyldodecyl)disulfide; 18,18'-bis(trimethoxysilyloctadecyl)disulfide; 18,18'-bis(methoxydimethylsilyloctadecyl)disulfide; 2,2-'-bis(trimethoxysilyl-2-methylethyl)disulfide; 2,2'-bis(triethoxysilyl-2-methylethyl)disulfide; 2,2'-bis(tripropoxysilyl-2-methylethyl)disulfide; and 2,2'-bis(trioctoxysilyl-2-methylethyl)disulfide.

The preferred organosilane disulfide for the compound (I) is the 3,3'-bis-(triethoxysilylpropyl)disulfide, which is also understood to be represented by bis-(3-triethoxysilylpropyl)disulfide.

In the practice of this invention, as hereinbefore pointed out, the rubber composition is comprised of at least one diene-based elastomer, or rubber. Suitable conjugated dienes are isoprene and 1,3-butadiene and suitable vinyl aromatic compounds are styrene and alpha-methylstyrene. Thus, it is considered that the elastomer is a sulfur curable elastomer. Such diene-based elastomer, or rubber, may be selected, for example, from at least one of cis 1,4-polyisoprene rubber (natural and/or synthetic), and preferably natural rubber), emulsion polymerization prepared styrene/butadiene copolymer rubber, organic solution polymerization prepared styrene/butadiene rubber, 3,4-polyisoprene rubber, isoprene/butadiene rubber, styrene/isoprene/butadiene terpolymer rubbers, cis 1,4-polybutadiene, medium vinyl polybutadiene rubber (35–50 percent vinyl), high vinyl polybutadiene rubber (50–75 percent vinyl), styrene/isoprene copolymers, emulsion polymerization prepared styrene/butadiene/acrylonitrile terpolymer rubber and butadiene/acrylonitrile copolymer rubber.

By emulsion polymerization prepared E-SBR, it is meant that styrene and 1,3-butadiene are copolymerized as an aqueous emulsion. Such are well known to those skilled in such art. The bound styrene content can vary, for example, from about 5 to 50%.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

As hereinbefore discussed, the precipitated silicas employed in this invention are precipitated silicas such as, for example, those obtained by the acidification of a soluble silicate, e.g., sodium silicate. Such precipitated silicas are well known to those having skill in such art. Also, as hereinbefore discussed, a variation of contemplated aluminosilicate is obtained by co-precipitating silica and aluminum.

Such precipitated silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 350, and more usually about 150 to about 300 ml/100 g.

Further, the silica, as well as the aforesaid alumina and aluminosilicate, may be expected to have a CTAB surface area in a range of about 100 to about 220. The CTAB surface area is the external surface area as evaluated by cetyl trimethylammonium bromide with a pH of 9. The method is described in ASTM D 3849 for set up and evaluation. The CTAB surface area is a well known means for characterization of silica.

Mercury surface area/porosity is the specific surface area determined by Mercury porosimetry. For such technique, mercury is penetrated into the pores of the sample after a thermal treatment to remove volatiles. Set up conditions may be suitably described as using a 100 mg sample; removing volatiles during two hours at 105° C. and ambient atmospheric pressure; ambient to 2000 bars pressure measuring range. Such evaluation may be performed according to the method described in Winslow, Shapiro in ASTM bulletin, p.39 (1959) or according to DIN 66133. For such an evaluation, a CARLO-ERBA Porosimeter 2000 might be used.

The average mercury porosity specific surface area for the precipitated silica should desirably be in a range of about 100 to 300 $m^2/g$.

A suitable pore size distribution for the silica, alumina and aluminosilicate according to such mercury porosity evaluation is desirably considered herein to be five percent or less of its pores having a diameter of less than about 10 nm; 60 to 90 percent of its pores have a diameter of about 10 to about 100 nm; 10 to 30 percent of its pores have a diameter of about 100 to about 1000 nm; and 5 to 20 percent of its pores have a diameter of greater than about 1000 nm.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations Hi-Sil 210, 243, etc; silicas available from Rhone-Poulenc, with, for example, designation of Zeosil 1165MP, silicas available from Degussa GmbH with, for example, designations VN2 and VN3, etc and silicas commercially available from Huber having, for example, a designation of Hubersil 8745.

Alumina, for the purposes of this invention, are natural and synthetic aluminum oxide (Al2O3). In some cases alumina has been used for such purpose either alone or in combination with silica. The term "alumina" can be described herein as "aluminum oxide, or Al2O3". Use of alumina in rubber compositions, can be shown, for example, in U.S. Pat. No. 5,116,886 and European Patent publication EPO 631,982 A2.

It is recognized that alumina can be in various forms, namely, acidic, neutral and basic forms. Generally, it is considered herein that the neutral form may be preferred.

Aluminosilicates, for the purpose of this invention, can be used an natural materials or synthetically prepared, particularly the co-precipitated silica and aluminum. For example, see U.S. Pat. No. 5,723,529.

In general, the term "aluminosilicates" can be described as natural or synthetic materials where the silicon atoms of a silicon dioxide are partially replaced, or substituted, either naturally or synthetically, by aluminum atoms. For example, about 5 to about 90, alternatively about 10 to about 80 percent of silicon atoms of a silicon dioxide might be replaced, or substituted, naturally or synthetically, by aluminum atoms to yield an aluminosilicate. A suitable process for such preparation might be described, for example, as by a co-precipitation by pH adjustment of a basic solution, or mixture, of silicate and aluminate also, for example, by a chemical reaction between SiO2, or silanols on the surface of a silicon dioxide, and NaAl O2. For example, in such co-precipitation process, the synthetic co-precipitated aluminosilicate may have about 5 to about 95 of its surface composed of silica moieties and, correspondingly, about 95 to about 5 percent of its surface composed of aluminum moieties.

Examples of natural aluminosilicates are, for example, Muscovite, Beryl, Dichroite, Sepiolite and Kaolinite. Examples of synthetic aluminosilicates are, for example, Zeolite and those which might be represented by formulas such as, for example, [(Al2O3)x.(SiO2)y.(H2O)z]; [(Al2O3)x.(SiO2)y.MO]; where M is magnesium or calcium. Use of aluminosilicates in rubber compositions can be shown, for example, in U.S. Pat. No. 5,116,886; European Patent publication EPO 063,982 A2, *Rubber Chem. Tech.*, Volume 50, page 606 (1988) and Volume 60, page 84 (1983).

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur-vulcanizable and sulfur-vulcanized material (rubbers), the additives mentioned above are selected and commonly used in conventional amounts.

Typical amounts of reinforcing type carbon blacks(s), for this invention, if used, are hereinbefore set forth. It is to be appreciated that the silica coupler may be used in conjunction with a carbon black, namely, pre-mixed with a carbon black prior to addition to the rubber composition, and such carbon black is to be included in the aforesaid amount of carbon black for the rubber composition formulation. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur-vulcanizing agent. Examples of suitable sulfur-vulcanizing agents include, for example, elemental sulfur (free sulfur) or sulfur donating vulcanizing agents, including the aforesaid organosilane polysulfide (II). As hereinbefore discussed, if desired additional sulfur donor compounds may be used such as, for example, an amine disulfide, polymeric polysulfide or sulfur olefin adducts. The sulfur-vulcanization agents are conventionally added in the final, productive, rubber composition mixing step.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The rubber composition of this invention can be used for various purposes. For example, it can be used for various tire compounds. Such tires can be built, shaped, molded and cured by various methods which are known and will be readily apparent to those having skill in such art.

The invention may be better understood by reference to the following examples in which the parts and percentages are by weight unless otherwise indicated.

EXAMPLE I

Sulfur vulcanizable rubber mixtures containing silica reinforcement were prepared and reported herein as experiments (samples) Ex 1, Ex 2 and Ex 3.

In particular, Ex 1 is intended to be a first control in which a bis(3-triethoxysilylpropyl)tetrasulfide compound (formula II) having an average of about 3.8 sulfur atoms in its polysulfidic bridge is mixed with the rubber composition in a preparatory, non-productive, mixing stage in an internal rubber mixer.

In particular, Ex 2 is intended to be a second control in which a bis(3-triethoxysilylpropyl)disulfide compound (formula I) having an average of about 2.2 sulfur atoms in its polysulfidic bridge is mixed with the rubber composition in a preparatory, non-productive, mixing stage in an internal rubber mixer.

Finally, and in accordance with this invention, a bis(3-triethoxysilylpropyl)disulfide compound (formula I) having an average of about 2.2 sulfur atoms in its polysulfidic bridge is mixed with the rubber composition in a preparatory, non-productive, mixing stage in an internal rubber mixer, followed by a separate and subsequent addition of a bis(3-triethoxysilylpropyl)tetrasulfide compound (formula II), having an average of about 3.8 sulfur atoms in its polysulfidic bridge, to the rubber composition in final, productive mixing stage in an internal rubber mixer.

In particular, for Sample Ex 3 which is intended to be exemplary of this invention, 6.64 phr of the organosilane disulfide compound of formula (I) are added in the preparatory, non-productive mixing stage, and one phr of the organosilane polysulfide compound of formula (II), and 1.4 phr of sulfur are added in the productive mixing stage.

Therefore, for the productive mixing stage, the calculated sulfur added, based upon 50 percent of the sulfur atoms in the polysulfidic bridge of the organosilane polysulfide compound (II), is 1.4 phr (free sulfur) plus 0.13 phr (from the organosilane polysulfide) which is to equal 1.53 phr. It is to be appreciated that the actual sulfur may differ somewhat from the calculated sulfur, depending upon the amount of sulfur released from the organosilane polysulfide compound (II).

After each mixing step the rubber mixture was batched off on a two roll mill, mill mixed for a short period of time, and slabs, or sheets, of rubber removed from the mill and allowed to cool to a temperature of about 30° C. or lower.

Rubber compositions containing the materials referenced in Table 1 were prepared in a BR Banbury mixer using three separate stages of addition (mixing), namely, two preparatory mix stages and one final mix stage to temperatures of 170° C., 160° C. and 120° C. and times of about 8 minutes, two minutes and twominutes, respectively for the three overall mix stages. The amounts of the organosilane disulfide and organosilane polysulfide are listed as being "variable" in Table 1 and their addition is more specifically set forth in Table 2.

TABLE 1

(Tread)

| | Parts |
|---|---|
| Non-Productive Mix Stages | |
| E-SBR[1] | 25 |
| Isoprene/Butadiene Rubber[2] | 45 |
| Cis 1,4-polybutadiene[3] | 20 |
| Natural Rubber[4] | 10 |
| Processing Aids[5] | 25 |
| Fatty Acid[6] | 2 |
| Silica[7] | 83 |
| Organosilane Disulfide (A)[8] | Variable |
| Productive Mix Stage | |
| Sulfur[9] | Variable |
| Zinc Oxide | 2.5 |
| Antioxidant (s)[10] | 3 |
| Sulfenamide & Guanidine Type Accelerators | 4 |
| Organosilane Polysulfide (B)[11] | Variable |

[1]Emulsion polymerization prepared styrene/butadiene copolymer rubber obtained from The Goodyear Tire & Rubber Company containing about 40 percent styrene and having a Tg of about −31° C. The E-SBR is reported in the Table on a dry weight basis of elastomer, although the E-SBR is oil extended and is composed of about 25 phr of SBR and about 15 phr of oil.
[2]Isoprene/butadiene (50/50 isoprene/butadiene) copolymer elastomer having a Tg of about −44° C. obtained from The Goodyear Tire & Rubber Company.
[3]Cis 1,4-polybutadiene elastomer obtained as BUDENE ® 1207 from The 'Goodyear Tire & Rubber Company.
[4]Natural cis 1,4-polyisoprene.
[5]Oil.
[6]Primarily stearic acid.
[7]Zeosil 1165 MP from Rhone Poulenc.
[8]A composite commercially available from Degussa GmbH as X266S in a form of a 50/50 blend, or composite, of Si266 (trademark of Degussa) and carbon black. The Si266 is a bis-(3-triethoxysilylpropyl) disulfide compound (I) understood to have an average of about 2.2 sulfur atoms in its polysulfidic bridge. Thus, the composite contains 5.0 percent of the organosilane disulfide compound which corresponds to formula I.

TABLE 1-continued (Tread)

| | Parts |
|---|---|

[9]Obtainable as an S8 elemental sulfur from the Kali Chemie company of Germany.
[10]A phenylene diamine type.
[11]A composite commercially available from Degussa GmbH as X50S in a form of a 50/50 blend of Si69, a trademark of Degussa GmbH, or what might be referred to as bis-(3-triethoxysilylpropyl) tetrasulfide compound (II) having an average of about 3.8 sulfur atoms in its polysulfide bridge, with carbon black and, thus, the organosilane tetrasulfide is considered as being 50% of the composite and, therefore, 50% active, which corresponds to the compound of formula II.

The Samples of Ex. 1, Ex. 2 and Ex. 3 were molded in a suitable mold and cured, or vulcanized, for about 16 minutes to a temperature of about 160° C.

Various physical properties of the rubber compositions are shown in the following Table 2 in which the addition of the organosilane disulfide and organosilane polysulfide, as well as addition of free sulfur, are also shown.

TABLE 2

| | Sample # | | |
|---|---|---|---|
| | Ex 1 | Ex 2 | Ex 3 |
| Non-Productive Mixing | | | |
| Polysulfide Coupling Agent (B) | 13.28 | 0 | 0 |
| Disulfide Coupling Agent (A) | 0 | 13.28 | 13.28 |
| Productive Mixing | | | |
| Sulfur | 1.4 | 2.1 | 1.4 |
| Polysulfide Coupling Agent (B) | 0 | 0 | 2 |
| Physical Properties | | | |
| Mooney[1] | 55 | 45 | 44 |
| Rheometer (150° C.) | | | |
| T90, (minutes) | 7.72 | 8.02 | 7.27 |
| Delta Torque | 36.5 | 35.5 | 34.2 |
| T90, (minutes) | 15.52 | 12.95 | 12.07 |
| Stress-Strain | | | |
| Tensile Strength, MPa | 15.2 | 13.6 | 16.3 |
| Elongation at Break (%) | 505 | 452 | 530 |
| 100% Modulus, Mpa | 2.2 | 2.3 | 2.7 |
| 300% Modulus, Mpa | 9.1 | 9.3 | 9.0 |
| 300/100 Modulus | 4.13 | 4.04 | 4.3 |
| Rebound | | | |
| 100° C., (%) | 60.7 | 61.6 | 60.0 |
| 23° C., (%) | 36.2 | 37.4 | 37.7 |
| Hardness | | | |
| Shore A | 69.7 | 67.3 | 67.3 |
| Dynaliser | | | |
| Tan Delta at 50° C. | 0.228 | 0.216 | 0.229 |
| DIN Abrasion (cc) | 118 | 115 | 98 |

[1]Mooney viscosity (ML-4) at 100° C. of the rubber mixture from the productive mix stage.

In particular, Ex 3 of this Example shows that the addition of the organosilane disulfide compound (formula I) during the non-productive mixing step plus the subsequent controlled addition of a the bis-(3-triethoxysilylpropyl) tetrasulfide compound (formula II) in the productive mixing step resulted in an increased tensile strength, increased elongation and increased modulus ratio without significantly affecting the hot and cold rebound values as compared to the first and second controls, namely Ex 1 and Ex 2.

This is considered as being beneficial because it is considered herein as being predictive of better wear performance without significantly affecting wet traction and rolling resistance for a tire having a tread of such rubber composition.

Further, the dynamic viscoelastic physical properties shown in Table 2 for the rubber compositions (Tan.Delta) show the same trend as the hot rebound.

This is considered herein as being beneficial because it indicates that such compounding approach shown by Ex 3 did not adversely affect the rubber composition's hysteresis and, therefore, predictive as not adversely affecting the overall tire rolling resistance of a tire having a tread of such rubber composition, as compared to the controls Ex 1 and Ex 2.

Further, the DIN abrasion value of Ex. 3 is significantly lower than that of both of the controls Ex. 1 and Ex. 2 and, thus, may be indicative of lower (better) treadwear for a tire tread which is considered herein to agree with the aforesaid modulus ratio observation.

In addition, the Mooney plasticity values shown by Ex. 3 as well as Ex. 2, as a measure of the viscosity of the rubber mixture, emphasizes the advantage of adding the organosilane disulfide instead of the organosilane polysulfide in the preparatory, non-productive, mixing stage, as far as rubber composition processing is concerned. In particular, the Mooney values shown in Table 2 are significantly less for both of Ex. 3 and Ex. 2 than the Mooney value for Ex. 1.

Therefore, use of the organosilane disulfide (formula I) in the preparatory, non-productive mixing, stage(s), while subsequently and separately adding the organosilane polysulfide (formula II) in the final, productive, mixing stage was observed to significantly improve various rubber composition properties of the cured rubber compositions, which is also accompanied by beneficial rubber processing in the non-productive mixing stage (i.e.: lower rubber viscosity).

Accordingly, it is considered herein that it has been shown that a combination of mixing of a prescribed organosilane disulfide with elastomer(s) and silica in a preparatory, non-productive mixing stage(s), followed by subsequent addition of a prescribed organosilane polysulfide in the subsequent, productive mixing stage at the lower temperature, followed by vulcanizing the rubber composition at the elevated temperature enhances the physical properties of the cured, or vulcanized, rubber composition.

By this preparation of the rubber composition, the silane interaction of a prescribed organosilane disulfide with a silica is separated from a liberation of free sulfur from a subsequently added organosilane polysulfide (II), under the prescribed temperature conditions which, also, includes a subsequent interaction of the silane component of the organosilane polysulfide compound (II) with the previously formed silane/filler composite, or network, caused by the interaction of the organosilane disulfide compound (I) with the silica in the preparatory, non-productive, mixing stage.

EXAMPLE II

Tires of size 195/65R15 were prepared which individually used the rubber compositions of Exs. 1, 2 and 3 of Example I for their treads and are correspondingly referred to as Exs. 1, 2 and 3 in this Example II. The following results were obtained as shown in Table 3 with the values for the control, Ex. 1, being normalized to a value of 100 and corresponding values for Ex. 2 and Ex. 3 being comparatively reported to the Control Ex. 1.

For the normalized values reported in Table 3, a higher value for rolling resistance means lower resistance to rolling so that a higher value is better; a higher value for treadwear means less tread wear so that a higher value is better; and a higher value for wet skid means greater traction and resistance to skidding on a wet surface so that a higher value is better.

TABLE 3

|  | Ex. 1 | Ex. 2 | Ex. 3 |
| --- | --- | --- | --- |
| Rolling Resistance | 100 | 101 | 101 |
| Treadwear | 100 | 102 | 111 |
| Wet skid | 100 | 102 | 103 |

This Example demonstrates that a tire with a tread of the rubber composition prepared according to this invention, namely Ex. 3, was observed to provide better tire treadwear (less wear) than the tires with tread of the rubber composition of Exs. 1 and 2.

This is considered herein to be advantageous because the observed wet skid, the rolling resistance shown in Table 3 are not substantially, or even appreciably, affected. Further, the processing of the rubber composition is not substantially affected, and is even improved over the preparation of Ex. 1, as shown in Table 2 for the Mooney (ML-4) viscosity.

In particular, an improvement is evidenced by the practice of this invention in the nature of a combined (1) rubber composition processing, (2) physical properties and (3) rubber tire, particularly tire tread, properties.

While certain representative embodiments and details have been shown for the purpose of illustrating the invention, it will be apparent to those skilled in this art that various changes and modifications may be made therein without departing from the spirit or scope of the invention.

What is claimed is:

1. A tire having a component comprised of a sulfur vulcanized rubber composition wherein said rubber composition is prepared by a process which comprises the steps of:

(A) thermomechanically mixing in at least one sequential preparatory, (non-productive) mixing step and to a temperature within a range of about 150° C. to about 185° C. and in the absence of addition of free sulfur, based upon 100 parts by weight per 100 parts by weight elastomer (phr) (1) 100 parts by weight of at least one diene-based elastomer selected from conjugated diene homopolymers and copolymers and copolymers of at least one conjugated diene and aromatic vinyl compound, (2) about 30 to about 100 phr of particulate reinforcing filler comprised of (a) about 5 to about 85 weight percent carbon black and, correspondingly, (b) about 15 to about 95 percent of at least one additional reinforcing filler selected from at least one of the group consisting of alumina and silica-based fillers selected from at least one of precipitated silica, aluminosilicate, and modified carbon black containing silicon hydroxide on its surface, and (3) about 0.05 to about 20, alternatively about 0.05 to about 10, parts by weight per part by weight of said alumina and silica-based filler of at least one organosilane disulfide compound of the formula (I):

$$Z-R_1-S_n-R_1-Z \qquad (I)$$

wherein n is a number of from 2 to about 6 and the average for n is in a range of from 2 to 2.6; followed by:

(B) mixing free sulfur and at least one organosilane polysulfide compound of formula (II) therewith in a subsequent (productive) mixing step to a temperature within in a range of about 100° C. to about 130° C.:

$$Z-R1-Sm-R1-Z \qquad (II)$$

wherein m is a number of from 2 to about 8 and the average for m is a range of about 3.5 to about 4.5;
wherein Z is selected from the group consisting of:

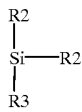 (Z1)

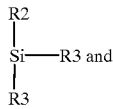 (Z2)

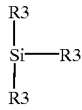 (Z3)

wherein R2 may be the same or different radical and is individually selected from the group consisting of alkyl radicals having 1 to 4 carbons and phenyl radical; R3 may be the same or different radical and is individually selected from the group consisting of alkyl radicals having 1 to 4 carbon atoms, phenyl radical, alkoxy groups having 1 to 8 carbon atoms and cycloalkoxy groups with 5 to 8 carbon atoms; and R1 is a radical selected from the group consisting of a substituted or unsubstituted alkyl radicals having a total of 1 to 18 carbon atoms and substituted or unsubstituted aryl radicals having a total of 6 to 12 carbon atoms; followed by:

(C) sulfur vulcanization of tire component.

2. The tire of claim 1 wherein, for said process of preparing said rubber composition for said tire component, said preparatory mixing is conducted in at least two internal mixing steps for a total internal mixing time for said preparatory (non-productive) mixing steps in a range of about four to about 15 minutes and the mixing time for said subsequent (productive) internal mixing step is in a range of about one to about three minutes, and wherein between each mixing step the rubber composition is mixed on an open roll mill for about two to about six minutes and thereafter allowed to cool to a temperature below about 40° C.; wherein said organosilane disulfide compound (I) and organosilane polysulfide compound (II) are bis-(3-alkoxysilylalkyl)polysulfides in which the alkyl radicals of the alkoxy component are selected from methyl and ethyl radicals and the alkyl radical of the silylalkyl component is selected from ethyl, propyl and butyl radicals, and wherein for mixing step (B) the total of free sulfur addition and about fifty percent of the sulfur in the polysulfidic bridge of said organosilane polysulfide compound (II) is in a range of about 0.93 to about 4 phr.

3. The tire of claim 1 wherein, for said process of preparing said rubber composition for said tire component, said organosilane disulfide compound (I) and organosilane polysulfide compound (II) are bis-(3-alkoxysilylalkyl) polysulfides in which the alkyl radicals of the alkoxy component are selected from methyl and ethyl radicals and the alkyl radical of the silylalkyl component is selected from ethyl, propyl and butyl radicals, and wherein for mixing step (B) the total of free sulfur addition and about fifty percent of the sulfur in the polysulfidic bridge of said organosilane polysulfide compound (II) is in a range of about 0.93 to about 4 phr.

4. The tire of claim 1 wherein, for said process of preparing said rubber composition for said tire component, said organosilane component of said organosilane disulfide compound (I) reacts during said preparatory mixing stage(s) with hydroxyl groups of at least one of said aluminosilicate, precipitated silica and modified carbon black to form a silane-based composite thereof; wherein said subsequently added organosilane polysulfide (II) interacts with said previously formed silane-based composite and liberates free sulfur during the vulcanization of the rubber composition at a temperature in a range of about 140° C. to about 190° C.

5. The tire of claim 3 wherein, for the process of preparing said rubber composition for said tire component, an organosilane component of said organosilane disulfide compound (I) reacts reacted during said preparatory mixing stage(s) with hydroxyl groups of at least one of said aluminosilicate, precipitated silica and modified carbon black to form a silane-based composite thereof; wherein said subsequently added organosilane polysulfide (II) interacts with said previously formed silane-based composite and liberates free sulfur during the vulcanization of the rubber composition at a temperature in a range of about 140° C. to about 190° C.

6. The tire of claim 1 wherein, for said process of preparing said rubber composition for said tire component, said particulate reinforcement is comprised of (a) said carbon black and (b) said at least one precipitated silica, aluminosilicate and said modified carbon black; wherein said aluminosilicate is prepared by a co-precipitation of silicate and aluminum electrolytes to form a silica/aluminum composite which contains from about 5 to about 95 weight percent aluminum, and wherein said modified carbon black is prepared by reacting an organosilane with carbon black at an elevated temperature or by co-fuming an organosilane and oil at an elevated temperature.

7. The tire of claim 3 wherein, for said process of preparing said rubber composition for said tire component, said particulate reinforcement is comprised of (a) said carbon black and (b) said at least one precipitated silica, aluminosilicate and said modified carbon black; wherein said aluminosilicate is prepared by a co-precipitation of silicate and aluminum electrolytes to form a silica/aluminum composite which contains from about 5 to about 95 weight percent aluminum and wherein said modified carbon black is prepared by reacting an organosilane with carbon black at an elevated temperature or by co-fuming an organosilane and oil at an elevated temperature.

8. The tire of claim 4 wherein for said process of preparing said rubber composition for said tire component, said particulate reinforcement is comprised of (a) said carbon black and (b) said at least one precipitated silica, aluminosilicate and said modified carbon black; wherein said aluminosilicate is prepared by a co-precipitation of silicate and aluminum electrolytes to form a silica/aluminum composite which contains from about 5 to about 95 weight percent aluminum and wherein said modified carbon black is prepared by reacting an organosilane with carbon black at an elevated temperature or by co-fuming an organosilane and oil at an elevated temperature.

9. The tire of claim 3 wherein, for said process of preparing said rubber composition for said tire component, said organosilane disulfide compound (I) and organopolysulfide compound (II) are of a bis-(3-trialkoxysilylalkyl) polysulfide wherein (a) the alkyl radicals of the alkoxy groups are selected from methyl and ethyl groups and the alkylene radical of the silylalkyl group is selected from ethyl, propyl and butyl radicals, and wherein (b) for the organosilane disulfide (I) at least 55 percent of n is 2.

10. The tire of claim 1 wherein, for said process of preparing said rubber composition for said tire component, a total of about 0.05 to about 5 phr of at least one alkyl alkoxy silane is added to said preparatory thermomechanical mixing step(s); wherein said alkyl silane has the formula (III):

R'—Si—(OR")$_3$     (III)

where R" is selected from at least one of methyl, ethyl, propyl and isopropyl radicals and R' is a saturated alkyl having from 1 to 18 carbon atoms or aryl or saturated alkyl substituted aryl radical having from 6 to 12 carbon atoms.

11. The tire of claim 3 wherein, for said process of preparing said rubber composition for said tire component, a total of about 0.05 to about 5 phr of at least one alkyl alkoxy silane is added to said preparatory thermomechanical mixing step(s); wherein said alkyl silane has the formula (III):

R'—Si—(OR")$_3$     (III)

where R" is selected from at least one of methyl, ethyl, propyl and isopropyl radicals and R' is a saturated alkyl having from 1 to 18 carbon atoms or aryl or saturated alkyl substituted aryl radical having from 6 to 12 carbon atoms.

12. The tire of claim 10 wherein said alkyl alkoxy silane is selected from at least one of propyltriethoxy silane, methyltriethoxy silane, hexadecyltriethoxy silane and octadecyltriethoxy silane.

13. The tire of claim 1 wherein, for said process of preparing said rubber composition for said tire component, said organosilane disulfide compound of formula (I) is selected from at least one of: 2,2'-bis(trimethoxysilylethyl) disulfide; 3,3'-bis(trimethoxysilylpropyl)disulfide; 3,3'-bis (triethoxysilylpropyl)disulfide; 2,2'-bis(triethoxysilylethyl) disulfide; 2,2'-bis(tripropoxysilylethyl)disulfide; 2,2'-bis(tri-sec.butoxysilylethyl)disulfide; 3,3'-bis(tri-t-butoxyethyl) disulfide; 3,3'-bis(triethoxysilylethyl tolylene)disulfide; 3,3'-bis(trimethoxysilylethyl tolylene)disulfide; 3,3'- bis (triisopropoxypropyl)disulfide; 3,3'-bis(trioctoxpropyl) disulfide; 2,2'-bis(2'-ethylhexoxysilylethyl)disulfide, 2,2'-bis(dimethoxy ethoxysilyethyl)disulfide; 3,3'-bis (methoxyethoxypropoxysilylpropyl)disulfide; 3,3'-bis (methoxy dimethylsilylpropyl)disulfide; 3,3'-bis (cyclohexoxy dimethylsilylpropyl)disulfide; 4,4'-bis (trimethoxysilylbutyl)disulfide; 3,3'-bis(trimethoxysilyl-3-methylpropyl)disulfide; 3,3'-bis(tripropoxysilyl-3-methylpropyl)disulfide; 3,3'-bis(dimethoxy methysilyl-3-ethylpropyl)disulfide; 3,3'-bis(trimethoxysilyl-2-methylpropyl)disulfide; 3,3'-bis(dimethoxyphenylsilyl-2-methylpropyl)disulfide; 3,3'-bis(trimethoxysilylcyclohexyl) disulfide; 12,12'-bis trimethoxysilyldodecyl)disulfide; 12,12'-bis(triethoxysilyldodecyl)disulfide; 18,18'-bis trimethoxysilyloctadecyl)disulfide; 18,18'-bis (methoxydimethylsilyloctadecyl)disulfide; 2,2'-bis (trimethoxysilyl-2-methylethyl)disulfide; 2,2'-bis (triethoxysilyl-2-methylethyl)disulfide; 2,2'-bis (tripropoxysilyl-2-methylethyl)disulfide; and 2,2'-bis (trioctoxysilyl-2methylethyl)disulfide.

14. The tire of claim 1 wherein, for said process of preparing said rubber composition for said tire component, the organosilane disulfide compound of formula (I) is 3,3'-bis(triethoxysilylpropyl)disulfide and where the organosilane polysulfide compound of formula (II) is at least one of bis-(3-trimethoxysilylpropyl)trisulfide, bis-(3-trimethoxylsilylpropyl)tetrasulfide, bis-(3-triethoxysilylpropyl)trisulfide, bis-(3-triethoxysilylethyltolylene)trisulfide and bis-(3-triethoxysilylethyltolylene)tetrasulfide, triethoxysilyethyltolylene)trisulfide and bis-(3-triethoxysilylethyltoylene)tetrasulfide.

15. The tire of claim 4 wherein, for said process of preparing said rubber composition for said tire component, the organosilane disulfide compound of formula (I) is 3,3'-bis(triethoxysilylpropyl)disulfide and where the organosilane polysulfide compound of formula (II) is at least one of bis-(3-trimethoxylsilylpropyl)trisulfide, bis-(3-trimethoxylsilylpropyl)tetrasulfide, bis-(3-triethoxysilylpropyl)trisulfide and bis-(3-triethoxysilylpropyl)tetrasulfide.

16. The tire of claim 2 wherein, for said process of preparing said rubber composition for said tire component, the organosilane disulfide compound of formula (I) is 3,3'-bis(triethoxysilyipropyl)disulfide and where the organosilane polysulfide compound of formula (II) is at least one of bis-(3-trimethoxylsilylpropyl)trisulfide, bis-(3-trimethoxylsilylpropyl)tetrasulfide, bis-(3-triethoxysilylpropyl)trisulfide and bis-(3-triethoxysilylpropyl)tetrasulfide.

17. The tire of claim 1 wherein said component is a tread.
18. The tire of claim 2 wherein said component is a tread.
19. The tire of claim 3 wherein said component is a tread.
20. The tire of claim 4 wherein said component is a tread.
21. The tire of claim 5 wherein said component is a tread.
22. The tire of claim 6 wherein said component is a tread.
23. The tire of claim 7 wherein said component is a tread.
24. The tire of claim 8 wherein said component is a tread.
25. The tire of claim 9 wherein said component is a tread.
26. The tire of claim 10 wherein said component is a tread.
27. The tire of claim 11 wherein said component is a tread.
28. The tire of claim 21 wherein said component is a tread.
29. The tire of claim 13 wherein said component is a tread.
30. The tire of claim 14 wherein said component is a tread.
31. The tire of claim 15 wherein said component is a tread.

32. The tire of claim 1 wherein said process of preparing said rubber composition additionally comprises the steps of shaping said rubber composition to form a tread stock, applying said tread stock to a rubber tire carcass to form an assembly thereof and molding and vulcanizing said assembly at a temperature in a range of about 140° C. to about 190° C. to form a tire.

33. The tire of claim 1 wherein said process of preparing said rubber composition additionally comprises the steps of shaping said rubber composition to form a tread stock, applying said tread stock to a rubber tire carcass to form an assembly thereof and molding and vulcanizing said assembly at a temperature in a range of about 140° C. to about 190° C. to form a tire; wherein the total of free sulfur and about 50 percent of the sulfur in the polysulfidic bridge of said organosilane polysulfide (II) is in a range of about 0.93 to about 4.

34. The tire of claim 1 wherein said process of preparing said rubber composition additionally comprises the steps of shaping said rubber composition to form a tread stock, applying said tread stock to a rubber tire carcass to form an assembly thereof and molding and vulcanizing said assembly at a temperature in a range of about 140° C. to about 190° C. to form a tire; wherein the total of free sulfur and about 50 percent of the sulfur in the polysulfidic bridge of said organosilane polysulfide (II) is in a range of about 0.93 to about 2.8.

35. The tire of claim 2 wherein said process of preparing said rubber composition additionally comprises the steps of shaping said rubber composition to form a tread stock, applying said tread stock to a rubber tire carcass to form an assembly thereof and molding and vulcanizing said assembly at a temperature in a range of about 140° C. to about 190° C. to form a tire.

36. The tire of claim 23 wherein said process of preparing said rubber composition additionally comprises the steps of shaping said rubber composition to form a tread stock, applying said tread stock to a rubber tire carcass to form an assembly thereof and molding and vulcanizing said assembly at a temperature in a range of about 140° C. to about 190° C. to form a tire.

37. The tire of claim 4 wherein said process of preparing said rubber composition additionally comprises the steps of shaping said rubber composition to form a tread stock, applying said tread stock to a rubber tire carcass to form an assembly thereof and molding and vulcanizing said assembly at a temperature in a range of about 140° C. to about 190° C. to form a tire.

38. The tire of claim 13 wherein said process of preparing said rubber composition additionally comprises the steps of shaping said rubber composition to form a tread stock, applying said tread stock to a rubber tire carcass to form an assembly thereof and molding and vulcanizing said assembly at a temperature in a range of about 140° C. to about 190° C. to form a tire; wherein the total of free sulfur and about 50 percent of the sulfur in the polysulfidic bridge of said organosilane polysulfide (II) is in a range of about 0.93 to about 4.

39. The tire of claim 14 wherein said process of preparing said rubber composition additionally comprises the steps of shaping said rubber composition to form a tread stock, applying said tread stock to a rubber tire carcass to form an assembly thereof and molding and vulcanizing said assembly at a temperature in a range of about 140° C. to about 190° C. to form a tire.

40. The tire of claim 15 wherein said process of preparing said rubber composition additionally comprises the steps of shaping said rubber composition to form a tread stock, applying said tread stock to a rubber tire carcass to form an assembly thereof and molding and vulcanizing said assembly at a temperature in a range of about 140° C. to about 190° C. to form a tire.

41. The tire of claim 2 wherein, for said process of preparing said rubber composition for said tire component, said particulate reinforcement is comprised of (a) said carbon black and (b) said at least one precipitated silica, aluminosilicate and said modified carbon black; wherein said aluminosilicate is prepared by a co-precipitation of silicate and aluminum electrolytes to form a silica/aluminum composite which contains from about 5 to about 95 weight percent aluminum and wherein said modified carbon black is prepared by reacting an organosilane with carbon black at an elevated temperature or by co-fuming an organosilane and oil at an elevated temperature.

* * * * *